United States Patent [19]
Takishima et al.

[11] Patent Number: 6,018,393
[45] Date of Patent: Jan. 25, 2000

[54] EVALUATING SYSTEM FOR A DUAL FOCUS LENS

[75] Inventors: Suguru Takishima; Toshiyuki Kase, both of Tokyo, Japan

[73] Assignee: Asahi Kogaku Kogyo Kabushiki Kaisha, Tokyo, Japan

[21] Appl. No.: 08/899,721

[22] Filed: Jul. 24, 1997

[30] Foreign Application Priority Data

Jul. 26, 1996 [JP] Japan .................................. 8-198000

[51] Int. Cl.⁷ ...................................................... G01B 9/02
[52] U.S. Cl. ........................................... 356/359; 356/345
[58] Field of Search ...................... 356/359, 360

[56] References Cited

U.S. PATENT DOCUMENTS 5,379,105  1/1995  Iki et al. ................................. 356/359
5,432,606  7/1995  Noguchi et al. .

OTHER PUBLICATIONS

"Superresolution Readout System with Electrical Equalization for Optical Disks" by Takaya Tanabe, *Applied Optics*, vol. 34, No. 29, Oct. 10, 1995.

"Aberration Limits for Annular Gaussian Beams for Optical Storage" by T.C. Strand and H. Werlich, *Applied Optics*, No. 16, Jun. 1, 1994.

*Primary Examiner*—Robert H. Kim
*Assistant Examiner*—Andrew H. Lee
*Attorney, Agent, or Firm*—Greenblum & Bernstein, P.L.C.

[57] ABSTRACT

An lens evaluating system for evaluating a dual-focus lens is disclosed. The lens evaluating system is provided with an interferometer to form an image of interference fringes and a masking system which masks a part of the image corresponding to a noise component.

14 Claims, 6 Drawing Sheets

EVALUATING SYSTEM FOR A DUAL FOCUS LENS

BACKGROUND OF THE INVENTION

The present invention relates to a lens evaluating system with using an interferometer.

Conventionally, an interferometer is used to evaluate a lens, for example to examine whether a lens has errors in shape, and/or uneven refractive index distribution inside the lens. Specifically, the interferometer is used to observe interference fringes representing characteristics of a lens with respect to a reference surface. The interferometer is generally provided with an image receiving element such as a CCD (Charge Coupled Device). Further, the interferometer is generally connected to a data processing device which is used to process image data output by the image receiving element, and then the interference fringe data is displayed on a displaying device connected to the data processing device. An engineer observes the displayed image of the interference fringes, and evaluates the lens.

Recently, a lens which has two different focal lengths (which will be referred to as a dual-focus lens) has been known. Such a lens (i.e., a dual-focus lens) is used, for example, as an optical pick-up device for a DVD system which is capable of reproducing data stored in a DVD and a CD.

Figure 7:
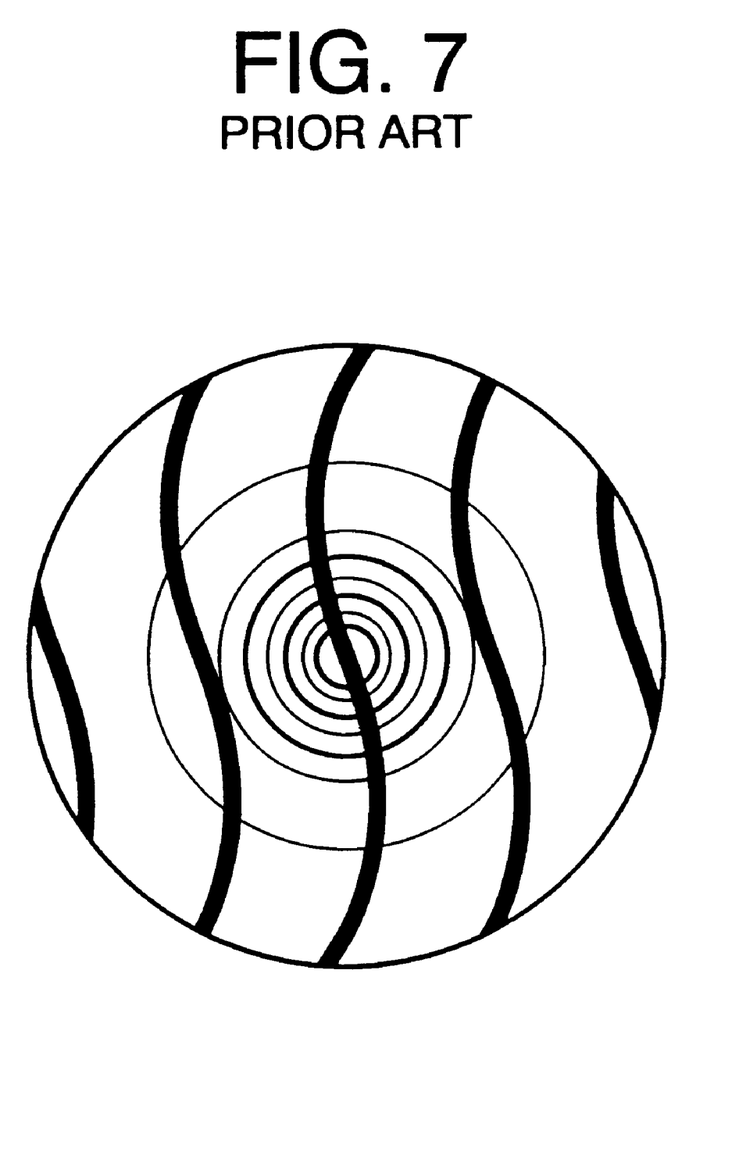
FIG. 7 shows interference fringes for a dual-focus lens, when a conventional lens evaluating apparatus is use.

When a dual-focus lens is evaluated with use of the conventional evaluating system, however, noise is observed in interference fringe image due to two different focal lengths of the dual-focus lens. An typical example is shown in FIG. 7, in which two types of interference fringes, which correspond to two different focal lengths of the dual-focus lens, are observed as overlapped interference fringes. Note that the noise appears as concentric circular interference fringes in a central part. Such a noise may prevent the observer from correct evaluation of the lens, and an improved evaluating apparatus for a dual-focus lens has been desired.

SUMMARY OF THE INVENTION

It is therefore an object of the present invention to provide an improved lens evaluating apparatus which substantially removes noise for interference fringes when a dual-focus lens is evaluated.

For the above object, according to an aspect of the invention, there is provided a lens evaluating system which is used for evaluating a lens, comprising: an interferometer which is used for observing interference fringes in accordance with light reflected by a reference surface, and light passed through the lens; and a light amount reduction system which reduces light amount of at least a part of the image of the interference fringes, the part of the image of the interference fringes being a portion at which noise overlaps.

Optionally, the evaluating system may be provided with a display system which displays an image of the interference fringes.

With this lens evaluating system, brightness of an image which serves as an obstacle to evaluation of the lens is reduced, an observer can observe the necessary portion of the interference fringes formed by the interferometer, and evaluate the lens precisely.

Optionally, the light amount of the image of the obstacle may be reduced with use of a filter member formed with a filter portion having a predetermined transmittance.

In particular, the filter member may include a transparent portion, and the filter portion is a circular area formed on the transparent portion. In this case, a portion of the light transmitted from the interferometer to the display system passes through the circular area corresponding to the noise component of the interference fringes. Accordingly, the image corresponding to the circular area is displayed with less brightness.

Alternatively, the light transmitted from the interferometer may pass through a filter portion which has the predetermined transmittance. In this case the brightness of the entire image decreases. Since the noise portion has less brightness, desired portion of the interference fringes can still be observed, and the evaluation of the lens can be made easily.

Further optionally, the display system may include an image receiving element which outputs an image signal corresponding to the received image, and a displaying device which displays an image of the received image in accordance with the image signal.

In particular, the lens to be evaluated is a dual-focus lens. In this case, the interference fringes are formed with respect to one focal point of the dual-focus lens, and the noise corresponds to interference fringes that are formed with respect to the other focal point of the dual-focus lens.

According to another aspect of the invention, there is provided a lens evaluating system which is used for evaluating a lens, comprising: an interferometer which is used for observing interference fringes in accordance with light reflected by a reference surface, and light passed through the lens; an image capturing system which captures an image of interference fringes which is formed by the interferometer and outputs an image signal corresponding to a captured image; a displaying system which displays an image of the interference fringes in accordance with the image signal; a masking system which controls the displaying system so as not to display at least a part of the image of the interference fringes, the part of the image of the interference fringes being a portion at which noise is overlapping.

In this case, an image which serves as an obstacle to evaluation of the lens is masked, and therefore an observer can observe the necessary portion of the interference fringes formed by the interferometer, and evaluate the lens precisely.

Optionally, the lens evaluating system may further include a complemental system which generates complemental image filled in the at least a part of the image masked by the masking system in accordance with the image signal corresponding to a displayed portion of the interference fringes. With this complemental system, even if the masked portion is relatively great in size with respect to the entire size of the image of the interference fringes, the observer may be able to evaluate the lens precisely.

Optionally, the lens may be a dual-focus lens.

According to further aspect of the invention, there is provided, in combination, a dual-focus lens and a lens evaluating system which is used for evaluating a lens, comprising: an interferometer which forms an image of interference fringes with respect to the dual-focus lens, the image of interference fringes including a first image of interference fringes corresponding to one focal length of the dual-focus lens, and a second image of interference fringes corresponding to the other focal length of the dual-focus lens; a masking system which applies a mask on one of the first and second images of interference fringes; and a display system which displays the image formed by the interferometer.

With this combination, the lens can be evaluated with respect either one of the focal points, and accordingly, the lens can be evaluated precisely.

Optionally, the masking system reduces brightness of one of the first and second images displayed by the display system.

Alternatively, the masking system inhibits the one of first and second images from being displayed by the display system. In this case, the displaying system generates complemental image for the one of first and second images, the complemental image being displayed instead of the one of the first and second images.

DESCRIPTION OF THE EMBODIMENTS

Figure 1:
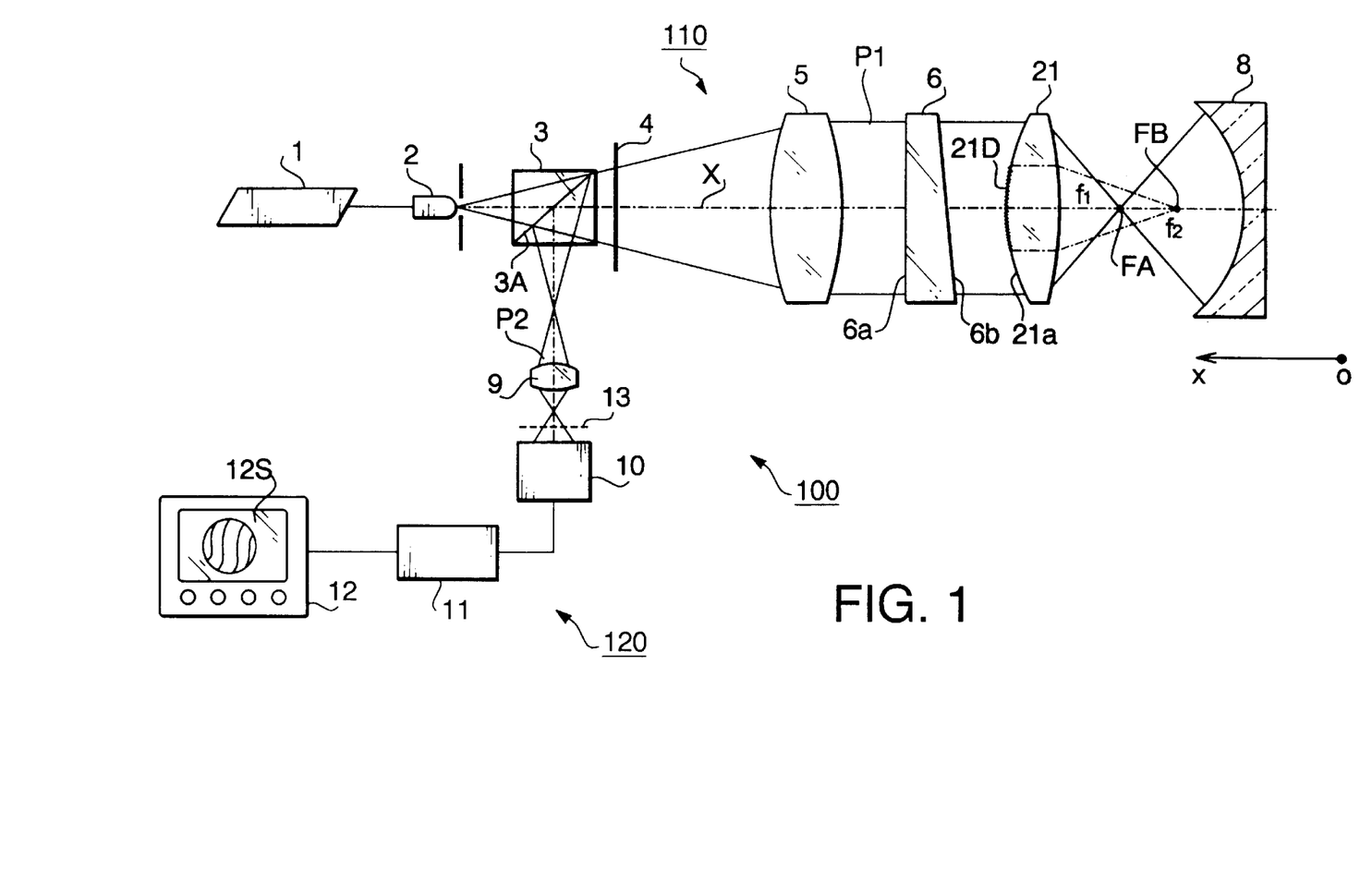
FIG. 1 is a diagram showing a schematic structure of a lens evaluating system.

FIG. 1 is a diagram showing a schematic structure of a lens evaluating system 100 according to an embodiment of the invention.

As shown in FIG. 1, the lens evaluating system 100 includes an interferometer system 110 and an image processing system 120. The interferometer system 110 includes a light source (laser source) 1, a beam expander 2, a beam splitter 3, a ¼ λ plate 4, a collimating lens 5, a reference element 6 having a reference surface 6a, a concave mirror (a spherical concave mirror) 8, an image forming lens 9. The image processing system 120 include an ND (neutral density) filter 13, a CCD 10, a data processing device 11, and a display 12. A lens 21 to be evaluated is inserted between the reference element 6 and the concave mirror 8 of the interferometer system 110.

The light source 1 emits a laser beam having a predetermined wavelength. The laser beam emitted by the laser source 1 is expanded to diverge by the beam expander 2. The expanded beam then passes through the beam splitter 3 and enters the ¼ λ plate 4. The beam splitter 3 is provided with a half mirror 3A, the beam passed through the half mirror 3A being linearly polarized. The ¼ λ plate 4 transforms linearly polarized light into circular polarized light. The collimating lens 5 collimates the expanded beam into a parallel beam P1. The parallel beam P1 passes through the reference element 6 and is incident to the lens 21 subjected to evaluation. The lens 21 is a dual-focus lens having two focal points FA and FB respectively corresponding to focal lengths of f1 and f2 (f1<f2). Specifically, as shown in FIG. 1, the lens 21 has a portion 21D where a diffractive gratings are formed. The portion 21D is a circular portion, viewed along the optical axis, whose center is the optical axis of the lens 21. The portion of the lens 21 which does not correspond to the portion 21D (i.e., outer side of the portion 21D) has the focal length f1, and the portion 21D has the focal length f2.

In FIG. 1, the lens 21 and the concave mirror 8 are positioned such that the focal point FA coincides with a focal point of the concave mirror 8. It should be noted that a driving mechanism (not shown) is provided in the lens evaluating system 100 for moving the concave mirror 8 in the direction of its optical axis (an x direction in FIG. 1). The evaluation of lens is performed with respect to each focal length of the lens, and the concave mirror 8 is moved so that the focal point of the concave mirror 8 coincides with each focal point of the dual-focus lens 21. The beam converged by the dual-focus lens 21 is reflected by the concave mirror 8 and directed back towards the beam splitter 3. It should be noted that the position of the concave mirror 8 along its optical axis can be adjusted with observing the interference fringes displayed on the display 12 so that the focal point of the concave mirror 8 accurately coincides with the focal point of the dual-focus lens 21. That is, when the concave mirror 8 is moved from one extremity of its movable range towards the other, a position at which relatively clear image of the interference fringes is displayed is found. This position corresponds to, for example, the focal point PB of the dual-focus lens 21. If the concave mirror 8 is moved towards the other extremity further, another position at which an image of the interference fringes displayed on the display 12 becomes clear. The position corresponds to the focal point FA of the dual-focus lens. Evaluation of the lens is performed with respect either one of the focal points FA and FB of the dual-focus lens 21.

The reference surface 6a of the reference element 6 is a surface perpendicular to the optical axis X of the lens evaluation system 100. Due to the ordinary polished nature of the surface 6a of the reference element 6, a part of the incident beam is reflected on the surface 6a. The beam reflected by the surface 6a goes back the path in which the incident beam has proceeded. The part of the beam reflected by the reference surface 6a proceeds back towards the beam splitter 3 as a reference beam. It should be noted that the other surface 6b of the reference element 6 is slightly inclined with respect to the surface 6a, and accordingly the component reflected by the surface 6b goes out of the optical axis X, and does not affect the interference infringes.

The beam passed through the reference element 6 is incident onto the lens 21 that is the lens to be evaluated. A part of the incident beam is reflected on a surface 21a of the lens 21. In general, the surface 21a is a convex surface, and the reflected beam diverges. Accordingly, a part of the beam which is reflected on the surface 21a and proceeds back towards the beam splitter 3 by way of the reference element 6, the collimating lens 5 and the ¼ λ plate has relatively low intensity. In the present embodiment, since the component reflected by the surface 21a is relatively weak for generating the interference fringes, the beam passed through the lens 21 is also used for evaluation, i.e., for generating the interference fringes. Specifically, the beam passed through the lens 21 is reflected by the concave mirror 8 and then directed to the beam splitter 3 through the lens 21, the reference elements 6, and the ¼ λ plate.

As described above, a component of the beam reflected by the surface 6a, and a component of the beam reflected by the surface 21a of the optical lens, and a component of the beam passed through the lens 21 and reflected on the surface of the concave mirror 8 are directed to the CCD 10 to form the interference fringes. The reference beam component, the component reflected by the surface 21a and the beam component passed through the lens 21 are incident to the ¼ λ plate 4 which transforms circular polarization light to linear polarization light. Note that the polarized direction of the reflected beam is shifted by 90 degrees with respect the beams emitted by the laser source 1 and passed through the half mirror 3A. The beam passed through the lens 21 are reflected on the beam splitter 3 and directed to the imaging lens 9. The beam converged by the imaging lens 9 passes through an ND (Neutral Density) filter 13, and then an image of interference fringes is formed on the image receiving surface of the CCD 10. The CCD 10 outputs image signal representative of the image of the interference fringes to the data processing device 11.

As mentioned briefly before, noise is included in the beam converged by the imaging lens 9. When the dual-focus lens 21 is examined, the interferometer 110 forms two interference fringe images; one corresponds to one focal point FA; and the other corresponds to the other focal point FB. When the focal point FA coincides with the focal point of the concave mirror 8, the beam converged by the lens 9 forms the interference infringes as shown in FIG. 7 on the CCD 10. The interference infringes with respect to the focal point FA is shown as lines across the entire area of the beam, while the interference infringes with respect to the focal point FB is shown as concentric circles.

Figure 2A:
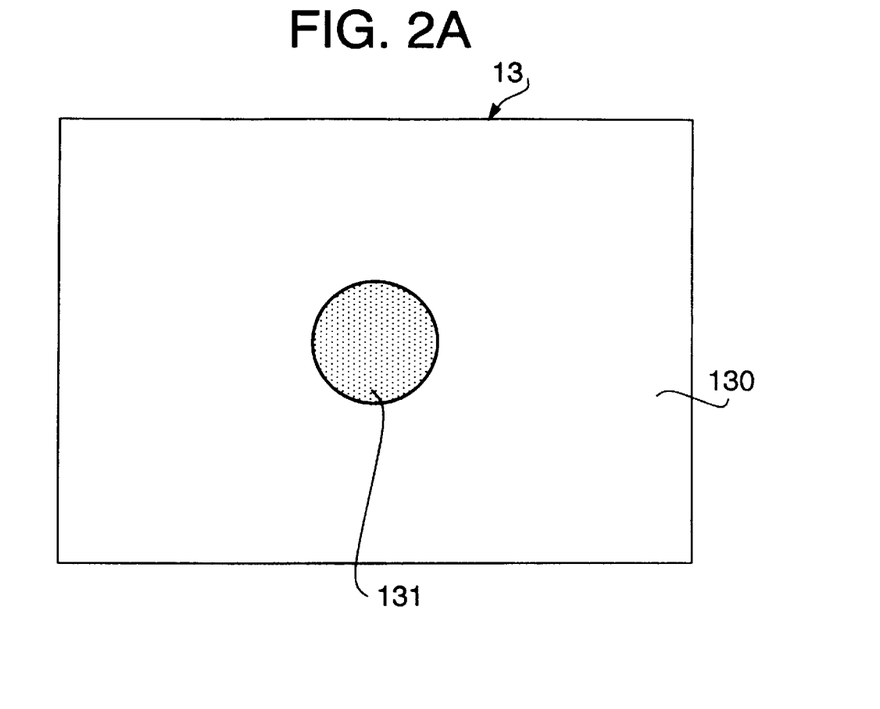
FIG. 2A shows a filter used in the lens evaluating system shown in FIG. 1.

According to a first embodiment of the invention, a filter 13 as shown in FIG. 2A is inserted in the optical path of the beam, between the imaging lens 9 and the CCD 10. The filter 13 is a transparent plate member (which may be formed by glass) 130, and on which an ND filter pattern 131 is formed (evaporated) The ND filter is a filter which reduces the intensity of a beam passed therethrough, reducing the amount of which is substantially the same regardless of a wavelength of a beam.

The ND filter pattern 131 according to the first embodiment is a circular area and the diameter of the ND filter pattern 131 is determined such that a part of the incident beam corresponding to the noise included in the interference fringes passes through the ND filer pattern 131. The noise is removed, or at least the intensity thereof is reduced by the ND filter pattern 131.

Figure 2B:
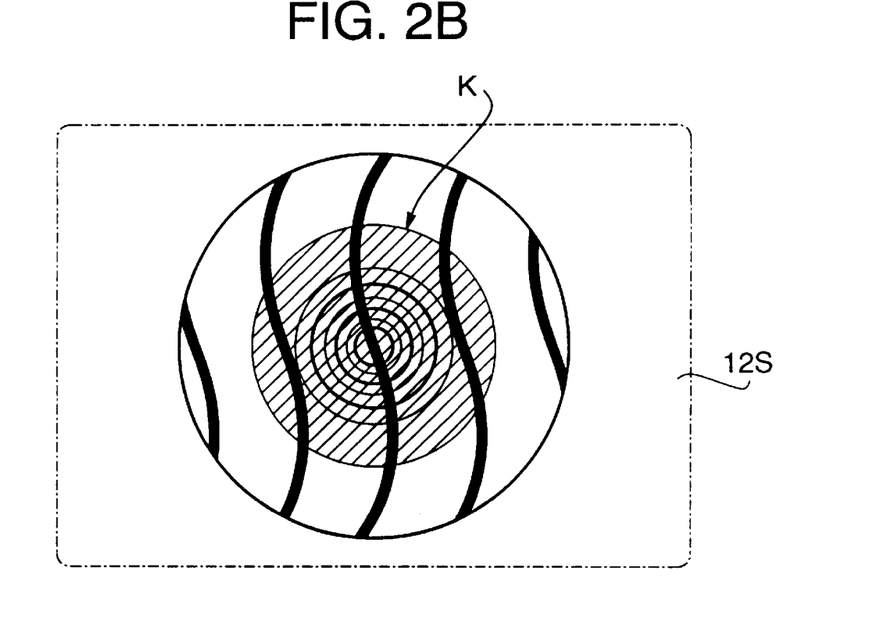
FIG. 2B shows a screen image of interference fringes wherein a noise part of the beam is covered by a filter shown in FIG. 2A.

FIG. 2B shows interference fringes displayed on the display 12 when the ND filter 13 shown in FIG. 2A is employed. An area K is the portion corresponding to the ND filter pattern 131 shown in FIG. 2A.

Figure 3A:
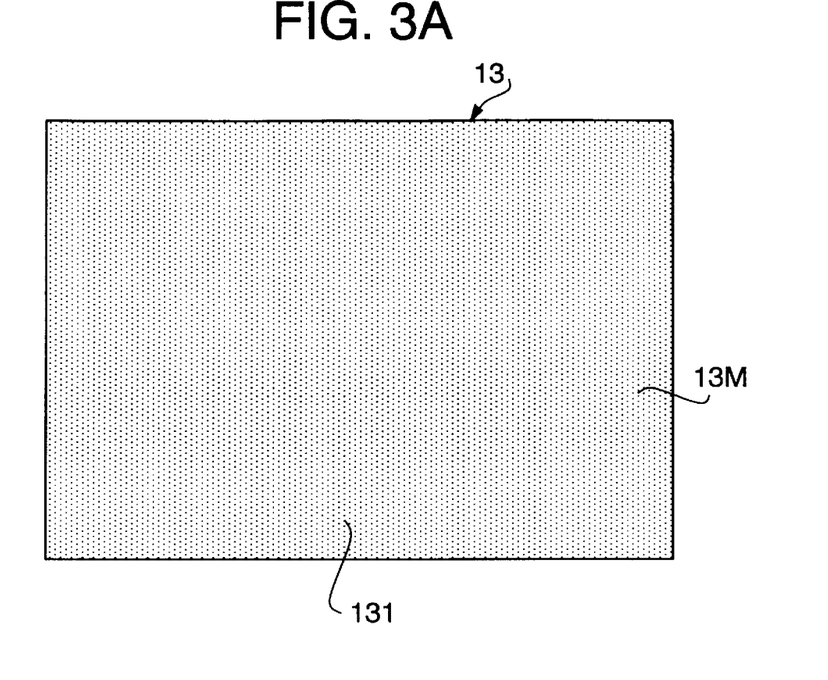
FIG. 3A shows a modified filter used in the lens evaluating apparatus shown in FIG. 1.

FIG. 3A shows an alternative filter 13M which is to replace the filter 13 described above. Generally, the intensities of the interference fringes corresponding to two focal lengths of the dual-focus lens 21 are greatly different from each other. In a situation shown in FIG. 1, the interference fringes corresponding to the portion of the lens 21 whose focal point FA coincides with the focal point of the concave mirror 8 are brighter than the interference fringes corresponding to the focal point FB of the lens 21, which is regarded as the noise as described above.

Figure 3B:
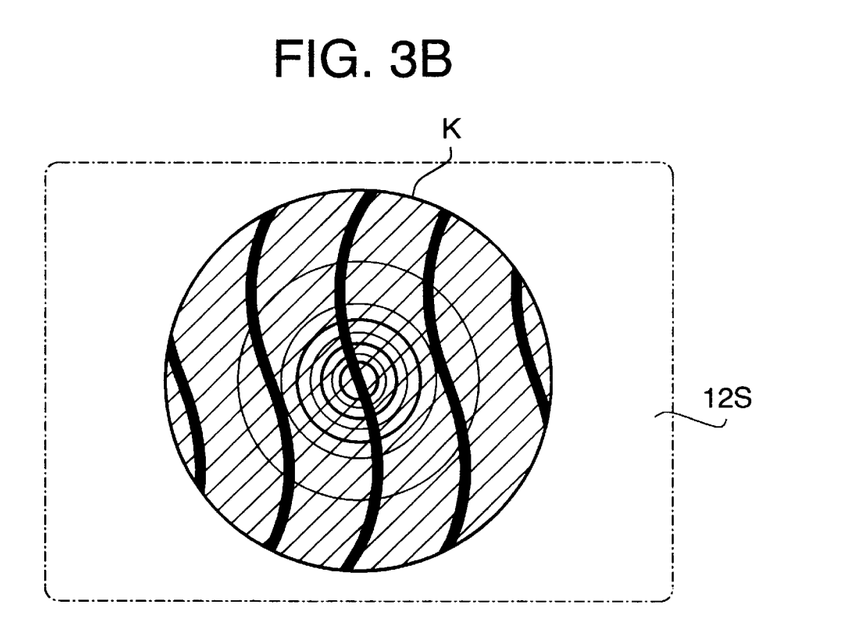
FIG. 3B shows a screen image of interference fringes wherein all of the beam is covered by a filter shown in FIG. 3A.

With use of the ND filter 13M, the beam passed through the imaging lens 9 passes through the ND filter pattern 131. Therefore, the intensity of the beam passed through the ND filter 13M is reduced. In this case, although brightness of the entire image of the interference fringes is reduced, the noise portion may be sufficiently dark on the display 12 with the interference fringes subjected to observation remained sufficiently bright, and accordingly, the observer can evaluate the dual-focus lens 21 based on the image of the interference fringes displayed on the display 12.

In the above embodiments, the noise of the image is reduced using filters. In the following embodiments, the influence of the noise is removed by processing image data with the data processing device 11.

Figure 6:
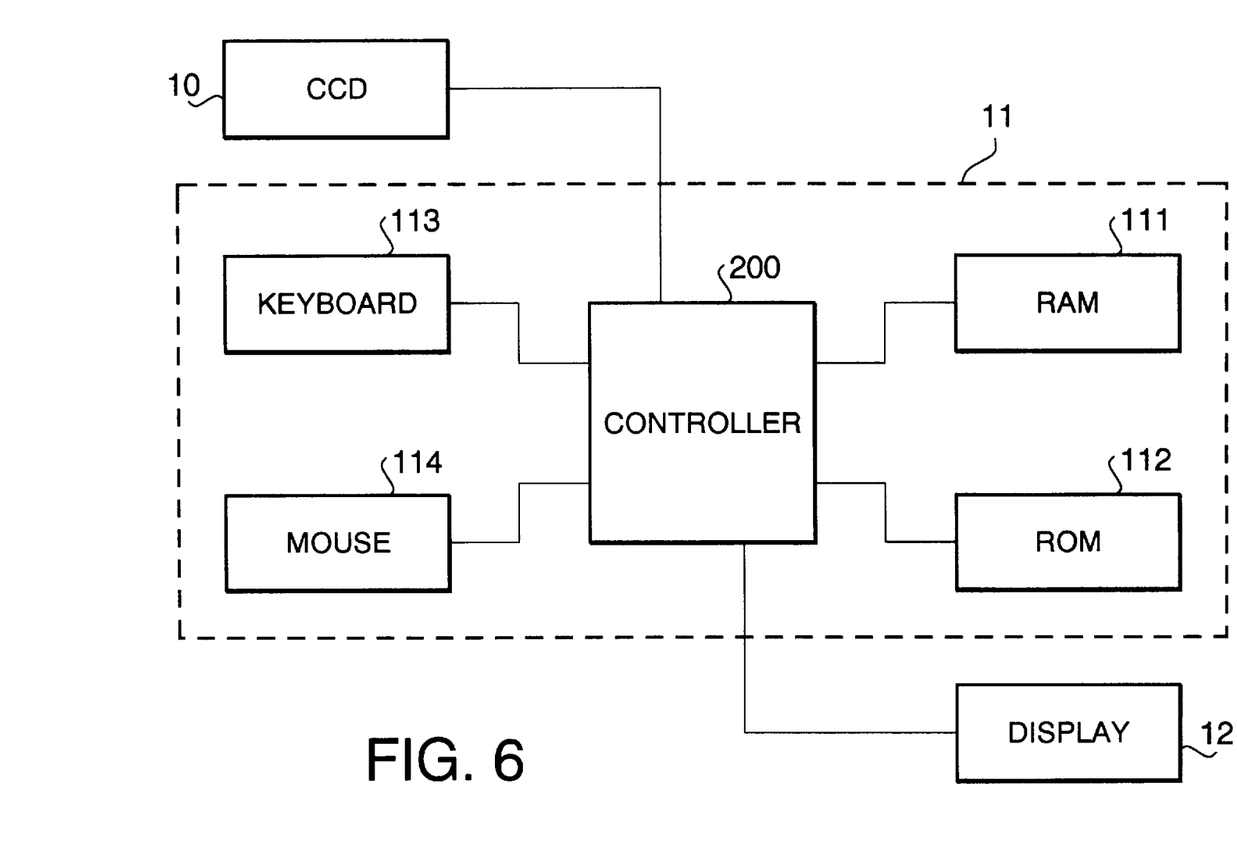
FIG. 6 shows a block diagram illustrating a control system of the data processing device.

FIG. 6 is a schematic block diagram of the data processing device 11. It should be noted that the data processing device 11 could be one of well-known conventional devices, and accordingly, only a brief description thereof will be provided. The data processing device 11 includes a controller 200 which controls operation of the entire system of the data processing device 11. To the controller 200, a keyboard 113, and a mouse 114 are connected to input data and/or commands to the controller 200. Further, a RAM 111 is connected to the controller 200 to store various data including image data of the interference infringes obtained through the CCD 10. The controller 200 is also connected with a ROM 112 which stores operation programs executed by the controller 200. The CCD 10 and the display 12 are also connected to the controller 200.

The controller 200 controls the CCD 10 to capture an image of the interference fringes, and stores image data of the interference fringes in the RAM 111. By processing the image data stored in the RAM 111, the noise part of the image of the interference fringes can be removed.

Figure 4:
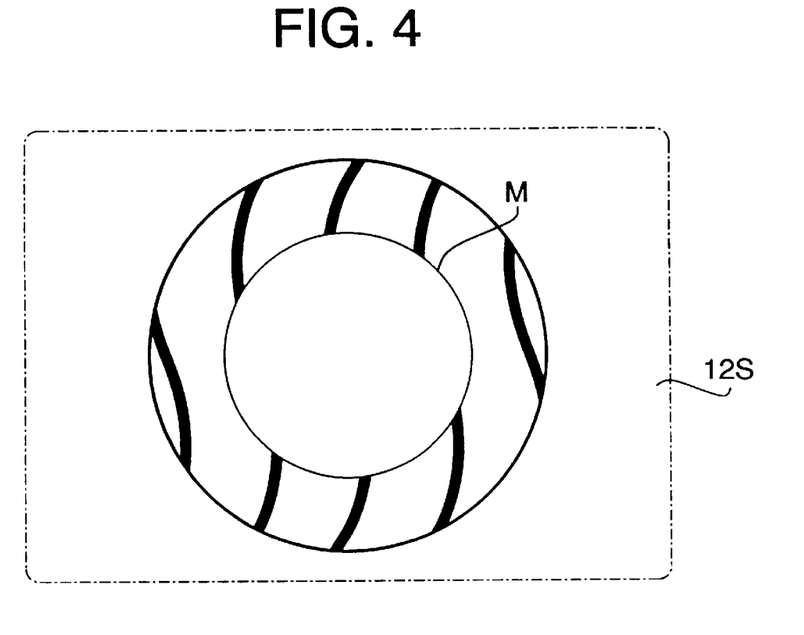
FIG. 4 shows a screen image of interference fringes wherein a noise part of the beam is masked by a data processing device.

Preferably, the controller 200 processes the image data stored in the RAM 111 to output a video signal to the display 12 with masking a region corresponding to the noise (i.e., the interference fringe image corresponding to the focal point FB that is not currently subjected to the observation). FIG. 4 shows an image of the interference fringes displayed on the screen 12S of the display 12 wherein the region M is masked. In this embodiment, the size of the masked region M is designated by the observer with use of the keyboard 113 or the mouse 114. Since the noise appears as concentric rings, and the center of the concentric rings is substantially a fixed position with respect to the image receiving area of the CCD 10 (and accordingly the fixed position on the screen 12S of the display 12), only by operating the keyboard 113 or mouse 114 to increase or decrease the diameter of the masked region M, the controller 110 is capable of displaying the interference infringes with the designated size of masked region M on the screen 12S of the display 12.

Figure 5:
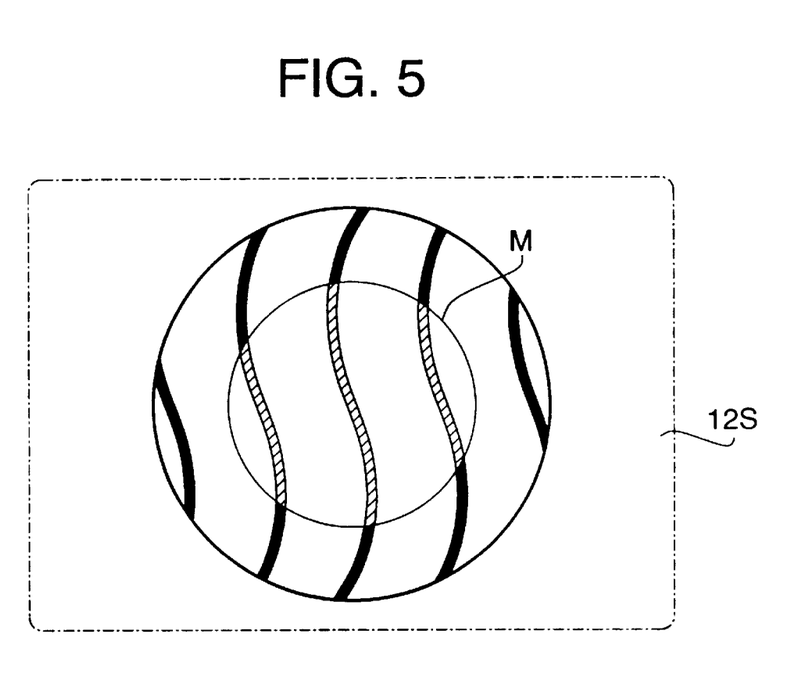
FIG. 5 shows a screen image of interference fringes wherein a noise part is masked, and further the interference fringes pattern is complemented on a masked region.

FIG. 5 shows an optional feature with respect to the embodiment described above. If the masked region M is relatively great in comparison to the entire size of the image of the interference fringes, it may be difficult to evaluate the lens 21 in question by observing the displayed image of the interference infringes with the masked region M. In such a case, interference fringes corresponding to the masked portion may be complemented as shown in FIG. 5.

For example, straight lines may be used to connect the fringes separated by the masked region M. The number and orientation of the straight lines can be determined based on the interference fringes outside the masked region M. Alternatively, the interference fringes in the central part can be complemented with use of, for example, a least squares method based on the exiting portion of the fringes shown in FIG. 5. It should be noted that more complicated complementing may also be possible. For example, from the existing interference fringes, a function representative of the shape of the fringes may be determined and then the shape of the fringes corresponding to the masked portion M may be calculated by the controller 200.

As above, if the lines are complemented in the masked region, the observer may evaluate the dual-focus lens more easily.

In the above embodiments, the lens evaluating system employs a Fiseau type interferometer. However, the invention is applicable if any other type of interferometer is used. Furthermore, if the image of the interference fringes is stored as image data in the RAM 111, it may be possible to extract the desired interference fringes by processing the image data. For example, by binarizing the image data with use of a predetermined threshold value, the noise component can be removed easily. In this case, it may be advantageous if the threshold value can be changed with use of the keyboard 114.

Although the structure and operation of a lens evaluating system is described herein with respect to the preferred embodiments, many modifications and changes can be made without departing from the spirit and scope of the invention.

Further, although in the embodiments, the lens evaluating system is described, the invention can be applied to various devices employing an interferometer. For example, it is known that the interferometer is used when an inclination of an objective lens of an optical pick-up of a DVD system is adjusted. The objective lens of the DVD system is a dual-focus lens, and therefore, it is advantageous to use the filter or the masking system as described when the inclination of the objective lens is measured.

The present disclosure relates to subject matter contained in Japanese Patent Application No. HEI 08-198000, filed on Jul. 26, 1996, which is expressly incorporated herein by reference in its entirety.

What is claimed is:

1. A lens evaluating system for evaluating a dual focus lens, said system comprising:

an interferometer which forms an image of interference fringes with respect to the dual focus lens, said image of interference fringes including a first image of interference fringes corresponding to one focal length of the dual focus lens, and a second image of interference fringes corresponding to an other focal length of the dual focus lens;

an image capturing system which captures said image of interference fringes and outputs an image signal;

a display system which displays an image of said interference fringes in accordance with said image signal; and a light amount reduction system which reduces an amount of light forming at least said second image to reduce an effect of noise on said interference fringes corresponding to said one focal length of the dual focus lens.

2. The lens evaluating system according to claim 1, wherein said light amount reduction system comprises a filter member formed with a filter portion having a predetermined transmittance, said filter member being inserted in a light path from said interferometer to said display system.

3. The lens evaluating system according to claim 2, wherein said filter member includes a transparent portion, and said filter portion is a circular area formed on said transparent portion, a portion of said light transmitted from said interferometer to said display system passing through said circular area corresponding to a noise component of said interference fringes.

4. The lens evaluating system according to claim 2, wherein said filter member includes a filter portion, said light transmitted from said interferometer passing through said filter portion.

5. The lens evaluating system according to claim 1, wherein said display system includes an image receiving element which outputs an image signal corresponding to the received image, and a displaying device which displays an image of said received image in accordance with said image signal.

6. The lens evaluating system according to claim 1, further including a concave mirror mounted for movement along an optical axis of the dual focus lens between positions at which a focal point of said concave mirror corresponds to each focal point of the dual focus lens.

7. A lens evaluating system for evaluating a dual focus lens, said system comprising:

an interferometer which forms an image of interference fringes with respect to the dual focus lens, said image of interference fringes including a first image of interference fringes corresponding to one focal length of the dual focus lens, and a second image of interference fringes corresponding to an other focal length of the dual focus lens;

an image capturing system which captures said image of interference fringes which is formed by said interferometer and outputs an image signal corresponding to a captured image;

a displaying system which displays an image of said interference fringes in accordance with said image signal; and a masking system that masks at least a part of said second image of interference fringes.

8. The lens evaluating system according to claim 7, further comprising a complemental system which generates complemental image that completes said at least a part of said image masked by said masking system in accordance with said image signal corresponding to a displayed portion of said interference fringes.

9. The lens evaluating system according to claim 7, further including a concave mirror mounted for movement along an optical axis of the dual focus lens between positions at which a focal point of said concave mirror corresponds to each focal point of the dual focus lens.

10. In combination, a dual-focus lens and a lens evaluating system which is used for evaluating a lens, comprising:

an interferometer which forms an image of interference fringes with respect to said dual-focus lens, said image of interference fringes including a first image of interference fringes corresponding to one focal length of said dual-focus lens, and a second image of interference fringes corresponding to the other focal length of said dual-focus lens;

a masking system which applies a mask on one of said first and second images of interference fringes; and a display system which displays said image formed by said interferometer.

11. The combination according to claim 10, wherein said masking system reduces brightness of one of said first and second images displayed by said display system.

12. The combination according to claim 10, wherein said masking system inhibits one of said first and second images from displayed by said display system.

13. The combination according to claim 12, wherein said displaying system generates complemental image for said one of said first and second images, said complemental image being displayed instead of said one of said first and second images.

14. The lens evaluating system according to claim 10, further including a concave mirror mounted for movement along an optical axis of the dual focus lens between positions at which a focal point of said concave mirror corresponds to each focal point of the dual focus lens.

* * * * *